United States Patent
Shen et al.

(10) Patent No.: US 12,082,246 B2
(45) Date of Patent: Sep. 3, 2024

(54) METHOD FOR TRANSMITTING CONTROL SIGNAL, AND TRANSMISSION NODE

(71) Applicant: VIVO MOBILE COMMUNICATION CO., LTD., Dongguan (CN)

(72) Inventors: Xiaodong Shen, Dongguan (CN); Xueming Pan, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 392 days.

(21) Appl. No.: 17/408,350

(22) Filed: Aug. 20, 2021

(65) Prior Publication Data

US 2021/0385861 A1 Dec. 9, 2021

Related U.S. Application Data

(63) Continuation of application No. PCT/CN2020/075574, filed on Feb. 17, 2020.

(30) Foreign Application Priority Data

Feb. 22, 2019 (CN) .......................... 201910135539.0

(51) Int. Cl.
*H04W 72/12* (2023.01)
*H04L 5/00* (2006.01)
*H04W 74/0808* (2024.01)

(52) U.S. Cl.
CPC .............................. *H04W 74/0808* (2013.01)

(58) Field of Classification Search
None
See application file for complete search history.

(56) References Cited

U.S. PATENT DOCUMENTS

| | | | | |
|---|---|---|---|---|
| 10,375,714 B2 * | 8/2019 | Anderson | ......... | H04W 72/1268 |
| 10,841,950 B2 * | 11/2020 | Sun | .................... | H04W 74/0808 |
| 10,841,953 B2 * | 11/2020 | Sun | ........................ | H04L 5/0094 |
| 10,887,912 B2 * | 1/2021 | Kim | ....................... | H04W 72/20 |
| 11,388,750 B2 * | 7/2022 | Kim | .................... | H04W 72/1268 |
| 2016/0345206 A1 | 11/2016 | Yerramalli et al. | | |
| 2017/0325098 A1 | 11/2017 | Kwan et al. | | |
| 2018/0368090 A1 * | 12/2018 | Kadambar | ............ | H04W 8/005 |
| 2019/0357252 A1 * | 11/2019 | Sun | ........................ | H04W 72/23 |

(Continued)

FOREIGN PATENT DOCUMENTS

| | | |
|---|---|---|
| CN | 105101446 A | 11/2015 |
| CN | 107667565 A | 2/2018 |
| CN | 108092697 A | 5/2018 |

(Continued)

OTHER PUBLICATIONS

U.S. Appl. No. 62/790,123 (Year: 2019).*

(Continued)

*Primary Examiner* — Sithu Ko
(74) *Attorney, Agent, or Firm* — IPX PLLC

(57) ABSTRACT

The present disclosure provides a method for transmitting a control signal, and a transmission node. The method includes: in a case that the transmission of the first control signal meets a transmission limiting condition of a short control signal, transmitting the first control signal by listen before talk (LBT) of category 1, or transmitting the first control signal after performing channel listening by LBT of category 2.

20 Claims, 3 Drawing Sheets

(56) References Cited

U.S. PATENT DOCUMENTS

2022/0078841 A1\* 3/2022 Tiirola ................. H04W 72/02

FOREIGN PATENT DOCUMENTS

| CN | 108702795 A | 10/2018 |
| CN | 109302773 A | 2/2019 |

OTHER PUBLICATIONS

U.S. Appl. No. 62/805,528 (Year: 2019).\*
International Search Report issued in corresponding International Application No. PCT/CN2020/075574, mailed Apr. 22, 2020, 4 pages.
Sony, "3GPP TSG RAN WG1 Meeting #94bis, R1-1810633", Considerations on channel access for NR unlicensed operations, Sep. 28, 2018.
First Office Action issued in related Chinese Application No. 201910135539.0, mailed Dec. 21, 2020, 7 pages.

\* cited by examiner

METHOD FOR TRANSMITTING CONTROL SIGNAL, AND TRANSMISSION NODE

CROSS-REFERENCE TO RELATED APPLICATIONS

This application is a bypass continuation of PCT Application No. PCT/CN2020/075574 filed Feb. 17, 2020, which claims priority to Chinese Patent Application No. 201910135539.0 filed in China on Feb. 22, 2019, both of which are incorporated herein by reference in their entireties.

TECHNICAL FIELD

The present disclosure relates to the technical field of communications, and more particularly, to a method for transmitting a control signal, and a transmission node.

BACKGROUND

The 5G communication system should follow listen before talk (LBT) mechanism when operating in an unlicensed band, that is, before information transmission, the terminal or network device needs to perform clear channel assessment (CCA) or extended clear channel assessment (eCCA) for channel listening, that is, to perform energy detection (ED). When energy is less than a certain threshold, the channel is determined to be idle, so that transmission may be started. Because the unlicensed band is shared by a plurality of technologies or a plurality of transmission nodes, this contention-based access manner leads to uncertainty of a channel available time. At present, there are three LBT categories which may be applied to a 5G unlicensed communication system: LBT category 1 (Cat 1): direct transmission may be performed without any CCA, and it may be used when the channel has been obtained and the transmission conversion interval is less than 16 us; LBT category 2 (Cat 2): 25 us channel listening is performed, and it may be used for a specific signal to obtain a channel and the maximum continuous transmission length should be less than a certain value, such as 1 ms; and LBT category 4 (Cat 4): channel listening with fusion random back-off, where different parameters are set for different priorities, and the maximum transmission lengths after the channel is acquired finally are different.

In an unlicensed band (such as 5 GHz), for a transmission node, regulation allows to transmit a short control signal without LBT as long as a certain limiting condition is met.

In one version, the limiting condition is that a duty ratio is less than or equal to 5% within a certain observation time (no specific value is specified).

In another version, the limiting conditions are the following two: within an observation period of 50 ms, the transmission number of the short control signals is less than or equal to 50; and within an observation period of 50 ms, the total transmission time of the short control signals is less than or equal to 2500 us.

At present, it is proposed to further modify the above limiting condition, for example, the limiting condition is that the duty ratio is less than or equal to 1%, and relevant discussions are still continuing.

At present, it is unclear how to transmit the control signal with reference to the control signal mechanism in the 5G unlicensed communication system.

SUMMARY

An embodiment of the present disclosure provides a method for transmitting a control signal, applied to a transmission node. The method includes: in a case that the transmission of the first control signal meets a transmission limiting condition of a short control signal, transmitting the first control signal by LBT of category 1, or transmitting the first control signal after performing channel listening by LBT of category 2.

An embodiment of the present disclosure further provides a transmission node, including: a first transmitting module, configured to, in a case that transmission of the first control signal meets a transmission limiting condition of a short control signal, transmit the first control signal by LBT of category 1, or transmit the first control signal after performing channel listening by LBT of category 2.

An embodiment of the present disclosure further provides a transmission node, including a processor, a memory and a program stored in the memory and capable of running on the processor, where when the program is executed by the processor, the steps of the above method for transmitting the control signal are implemented.

An embodiment of the present disclosure further provides a computer readable storage medium. The computer readable storage medium stores a program, and when the program is executed by a processor, the steps of the above method for transmitting the control signal are implemented.

BRIEF DESCRIPTION OF THE DRAWINGS

In order to describe the technical solution of the embodiments of the present disclosure more clearly, the accompanying drawings required for describing the embodiments of the present disclosure will be simply introduced below. Obviously, the accompanying drawings described below merely illustrate some embodiments of the present disclosure. Those of ordinary skill in the art may also derive other accompanying drawings from these accompanying drawings.

DETAILED DESCRIPTION

The technical solutions in the embodiments of the present disclosure are described below clearly with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure shall fall within the protection scope of the present disclosure.

In the embodiments of the present disclosure, the term such as "exemplary" or "for example" is used to represent giving an example, an illustration, or a description. Any embodiment or design scheme described as "exemplary" or "for example" in the embodiments of the present disclosure should not be construed as being more preferred or advantageous than other embodiments or design schemes. To be precise, the use of the term such as "exemplary" or "for example" is intended to present a related concept in a specific manner.

Figure 1:
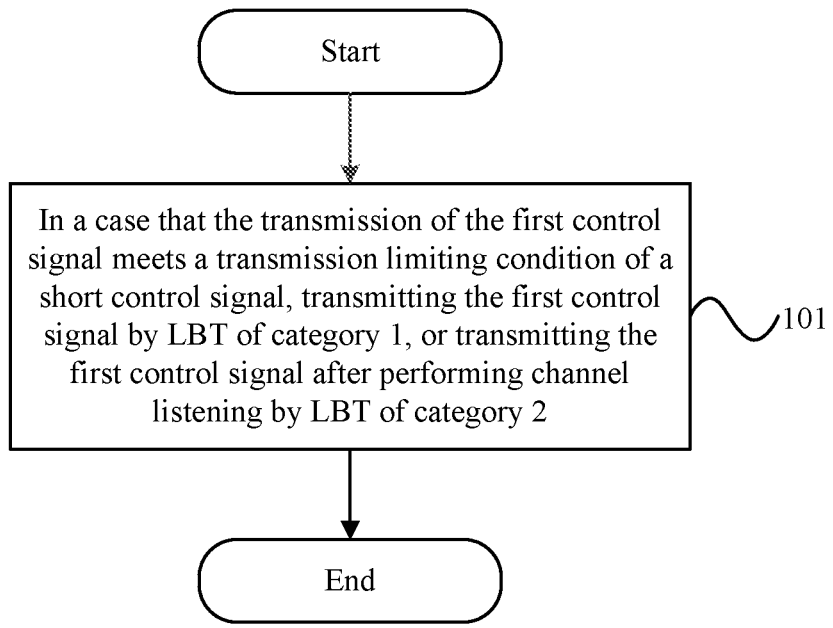
FIG. 1 is a schematic diagram of steps of a method for transmitting a control signal according to an embodiment of the present disclosure.

As shown in FIG. 1, an embodiment of the present disclosure provides a method for transmitting a control signal, applied to a transmission node and including:

step 101: in a case that the transmission of the first control signal meets a transmission limiting condition of a short control signal, transmitting the first control signal by LBT of category 1, or transmitting the first control signal after performing channel listening by LBT of category 2.

Optionally, the transmission of the control signal provided by the embodiment of the present disclosure is the transmission of the control signal in an unlicensed band. The short control signal specifically refers to a signal which meets a certain limiting condition (such as a duty ratio and the like) and can be transmitted by LBT with higher priority.

It should be noted that if the transmission of the first control signal meets the transmission limiting condition of the control signal, it indicates that the transmission of the first control signal can perform LBT with reference to the transmission mechanism of the short control signal.

Specifically, the step of transmitting the first control signal by LBT of category 1 specifically refers to: transmitting the first control signal according to the transmission mechanism of the short control signal without clear channel assessment (CCA).

The step of transmitting the first control signal after performing channel listening by LBT of category 2 specifically refers to: performing 25 us channel listening before transmitting the first control signal; transmitting the first control signal according to the transmission mechanism of the short control signal if the channel is determined to be idle; and not transmitting the first control signal if the channel is determined to be not idle.

Optionally, the method further includes:
in a case that the transmission of the first control signal does not meet the transmission limiting condition of the short control signal, transmitting the first control signal after performing channel listening by LBT of category 4.

It should be noted that if the transmission of the first control signal does not meet the transmission limiting condition of the control signal, it indicates that the transmission of the first control signal cannot perform LBT with reference to the transmission mechanism of the short control signal. In view of this situation, an embodiment of the present disclosure provides a manner for transmitting the first control signal after performing channel listening by LBT of category 4, that is, performing channel listening with fusion random back-off before transmitting the first control signal, transmitting the first control signal if the channel is determined to be idle, and not transmitting the first control signal if the channel is determined to be not idle.

According to the above example, the embodiment of the present disclosure provides at least two manners for determining whether the transmission of the first control signal meets the transmission limiting condition of the short control signal before transmitting the first control signal, specifically as follows:

first manner: determining whether the transmission of the first control signal meets the transmission limiting condition of the short control signal by determining whether transmission information of a target signal in a target observation window meets the transmission limiting condition of the short control signal before transmitting the first control signal; and second manner: determining the transmission of the first control signal meets the transmission limiting condition of the short control signal by determining whether a to-be-transmitted position of the first control signal is in a silent period of other short control signals before transmitting the first control signal.

As an optional embodiment, for the first manner:
in the embodiment of the present disclosure, the method further includes:
determining that the transmission of the first control signal meets the transmission limiting condition of the short control signal according to the transmission information of the target signal in the target observation window before transmitting the first control signal,
where the target signal includes: a signal transmitted according to the short control signal in the target observation window, and the first control signal.

Optionally, the step of determining that the transmission of the first control signal meets the transmission limiting condition of the short control signal according to the transmission information of the target signal in the target observation window includes:
determining that the transmission of the first control signal meets the transmission limiting condition of the short control signal in a case that the transmission information of the target signal in the target observation window meets the transmission limiting condition of the short control signal.

In the embodiment of the present disclosure, the method further includes:
determining that the transmission of the first control signal does not meet the transmission limiting condition of the short control signal according to the transmission information of the target signal in the target observation window before transmitting the first control signal,
where the target signal includes: a signal transmitted according to the short control signal in the target observation window, and the first control signal.

Optionally, the step of determining that the transmission of the first control signal does not meet the transmission limiting condition of the short control signal according to the transmission information of the target signal in the target observation window includes:
determining that the transmission of the first control signal does not meet the transmission limiting condition of the short control signal in a case that the transmission information of the target signal in the target observation window does not meet the transmission limiting condition of the short control signal.

Specifically, in the above embodiments of the present disclosure, the transmission limiting condition of the short control signal includes at least one of the followings:
in the target observation window, a ratio of a total transmission time of the target signal to a total time of the target observation window is less than or equal to a first preset value, where the first preset value is a maximum duty ratio of the transmission limiting condition of the control signal, such as 1%, 5% and the like, which is not specifically limited here; or in the target observation window, the total transmission number of the target signal is less than or equal to a second preset value, and the total transmission time of the target signal is less than or equal to a third preset value.

It should be noted that the total transmission time of the target signal includes: the sum of the transmission time of the signal which has been transmitted according to the short control signal in the target observation window and the transmission time of the first control signal. The total transmission number of the target signal includes: the transmission number of the signal which has been transmitted according to the short control signal in the target observation window plus 1.

Figure 2:
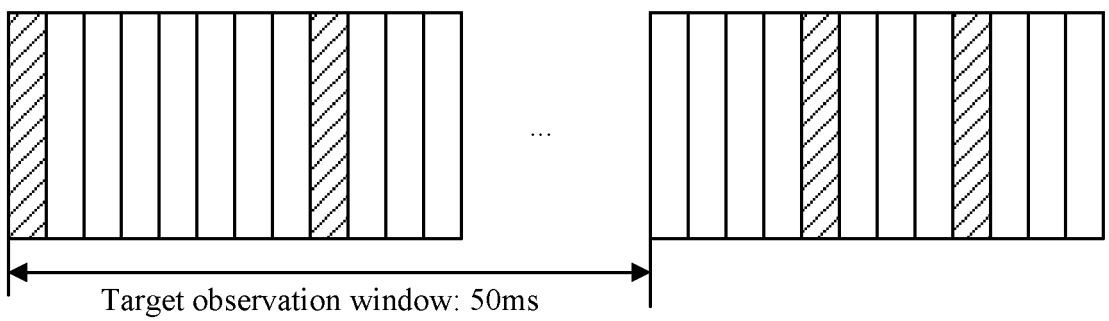
FIG. 2 is a first schematic diagram of a target observation window in a method for transmitting a control signal according to an embodiment of the present disclosure.
Figure 3:
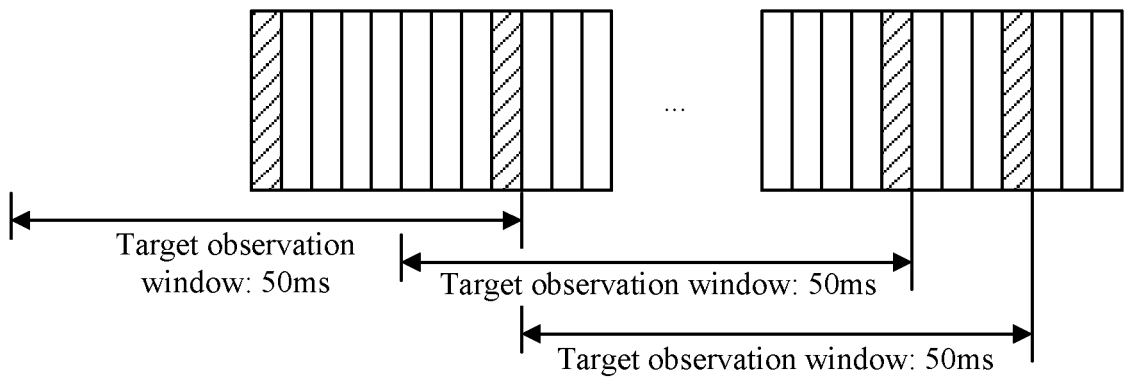
FIG. 3 is a second schematic diagram of a target observation window in a method for transmitting a control signal according to an embodiment of the present disclosure.

Optionally, in this embodiment of the present disclosure, the method further includes:

determining the target observation window according to a time length and a time position of the observation window configured by static or semi-static configuration information; or determining the target observation window according to a time length and a time position of the observation window agreed by a protocol, for example, as shown in FIG. 2, the target observation window is determined according to the configuration of the static or semi-static configuration information or the agreement of the protocol;

or according to a to-be-transmitted position of the first control signal and a preset time length of the target observation window, determining the target observation window as: a preset time length ahead of the to-be-transmitted position of the first control signal, for example, as shown in FIG. 3, the target observation window is determined according to the to-be-transmitted position of the first control signal and the preset time length of the target observation window, and the target observation window may be called a sliding observation window. The shaded part in FIG. 3 is the to-be-transmitted position of the first control signal. If the preset time length is equal to 50 ms, the target observation window is 50 ms ahead of the to-be-transmission position of the first control signal.

As another optional embodiment, for the second manner:
in the embodiment of the present disclosure, the method further includes:
determining that the transmission of the first control signal meets the transmission limiting condition of the short control signal according to the to-be-transmitted position of the first control signal and a silent period of other short control signals before transmitting the first control signal, where the silent period of other short control signals is: a target time length starting from the transmission ending time of the other short control signals.

Optionally, the step of determining that the transmission of the first control signal meets the transmission limiting condition of the short control signal according to the to-be-transmitted position of the first control signal and the silent period of other short control signals includes:

determining that the transmission of the first control signal meets the transmission limiting condition of the short control signal in a case that the to-be-transmitted position of the first control signal is not in the silent period of other short control signals.

In the embodiment of the present disclosure, the method further includes:

determining that the transmission of the first control signal does not meet the transmission limiting condition of the short control signal according to the to-be-transmitted position of the first control signal and a silent period of other short control signals before transmitting the first control signal, where the silent period of other short control signals is: a target time length starting from the transmission ending time of the other short control signals.

Optionally, the step of determining that the transmission of the first control signal does not meet the transmission limiting condition of the short control signal according to the to-be-transmitted position of the first control signal and the silent period of other short control signals includes:

determining that the transmission of the first control signal does not meet the transmission limiting condition of the short control signal in a case that the to-be-transmitted position of the first control signal is in the silent period of other short control signals.

Optionally, in this embodiment of the present disclosure, the method further includes:

determining the target time length T according to a time length T0 of the short control signal and a maximum duty ratio α of the transmission limiting condition of the short control signal,
wherein $$T = \frac{T0}{\alpha} - T0.$$

Figure 4:
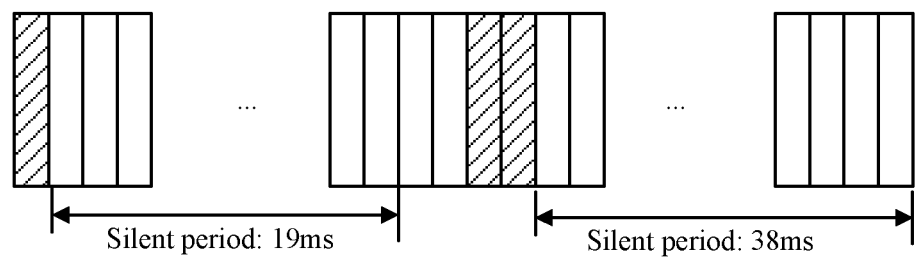
FIG. 4 is a third schematic diagram of a target observation window in a method for transmitting a control signal according to an embodiment of the present disclosure.

For example, as shown in FIG. 4, it is a schematic diagram of a silent period of a short control node.

It should be noted that in the embodiment of the present disclosure, when it is judged whether the to-be-transmitted position of the first control signal is in the silent period of other short control signals, the to-be-transmitted position of the first control signal specifically may be a to-be-transmitted starting position of the first control signal, may also be a to-be-transmitted ending position of the first control signal, and may also be a to-be-transmitted time period of the first control signal, which is not specifically limited here.

Furthermore, it should be noted that the above first control signal may be a downlink control signal (for example, a dedicated reference signal (DRS), a physical downlink control channel (PDCCH) transmission) or an uplink control signal (for example, a physical random access channel (PRACH), a scheduling request (SR) and physical uplink control channel (PUCCH) transmission). The above first control signal may be one or more control signals of the transmission node, which is not specifically limited here.

To sum up, according to the embodiments of the present disclosure, by determining whether the transmission of the first control signal meets the transmission limiting condition of the short control signal before transmitting the first control signal, LBT is performed and the first control signal is transmitted with reference to the transmission mechanism of the short control signal in a case that the transmission limiting condition of the short control signal is met, and the transmission performance of the control signal is improved by completely utilizing the transmission mechanism of the control signal in the unlicensed band.

Figure 5:
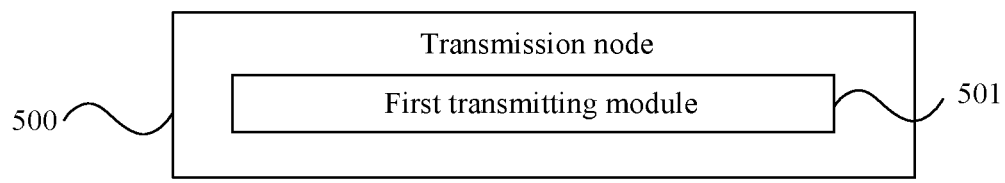
FIG. 5 is a first structural schematic diagram of a transmission node according to an embodiment of the present disclosure.

As shown in FIG. 5, the embodiment of the present disclosure further provides a transmission node 500, including:

a first transmitting module 501, configured to, in a case that transmission of the first control signal meets a transmission limiting condition of a short control signal, transmit the first control signal by LBT of category 1, or transmit the first control signal after performing channel listening by LBT of category 2.

Optionally, in the above embodiments of the present disclosure, the transmission node further includes:

a second transmitting module, configured to, in a case that the transmission of the first control signal does not meet the transmission limiting condition of the short control signal, transmit the first control signal after performing channel listening by LBT of category 4.

Optionally, in the above embodiments of the present disclosure, the transmission node further includes:

a first determining module, configured to determine that the transmission of the first control signal meets the transmission limiting condition of the short control signal according to transmission information of a target signal in a target observation window before transmitting the first control signal, where the target signal includes: a signal transmitted according to the short control signal in the target observation window, and the first control signal.

Optionally, in the above embodiments of the present disclosure, the first determining module includes:

a first determining submodule, configured to determine that the transmission of the first control signal meets the transmission limiting condition of the short control signal in a case that the transmission information of the target signal in the target observation window meets the transmission limiting condition of the short control signal.

Optionally, in the above embodiments of the present disclosure, the transmission node further includes:

a second determining module, configured to determine that the transmission of the first control signal does not meet the transmission limiting condition of the short control signal according to transmission information of a target signal in a target observation window before transmitting the first control signal, where the target signal includes: a signal transmitted according to the short control signal in the target observation window, and the first control signal.

Optionally, in the above embodiments of the present disclosure, the second determining module includes:

a second determining submodule, configured to determine that the transmission of the first control signal does not meet the transmission limiting condition of the short control signal in a case that the transmission information of the target signal in the target observation window does not meet the transmission limiting condition of the short control signal.

Optionally, in the above embodiments of the present disclosure, the transmission limiting condition of the short control signal includes at least one of the followings:

in the target observation window, a ratio of a total transmission time of the target signal to a total time of the target observation window is less than or equal to a first preset value; or in the target observation window, the total transmission number of the target signal is less than or equal to a second preset value, and the total transmission time of the target signal is less than or equal to a third preset value.

Optionally, in the above embodiments of the present disclosure, the transmission node further includes:

a third determining module, configured to determine the target observation window according to a time length and a time position of the observation window configured by static or semi-static configuration information, or configured to determine the target observation window according to a time length and a time position of the observation window agreed by a protocol, or configured to, according to a to-be-transmitted position of the first control signal and a preset time length of the target observation window, determine the target observation window as: a preset time length ahead of the to-be-transmitted position of the first control signal.

Optionally, in the above embodiments of the present disclosure, the transmission node further includes:

a fourth determining module, configured to determine that the transmission of the first control signal meets the transmission limiting condition of the short control signal according to the to-be-transmitted position of the first control signal and a silent period of other short control signals before transmitting the first control signal, where the silent period of other short control signals is: a target time length starting from the transmission ending time of the other short control signals.

Optionally, in the above embodiments of the present disclosure, the fourth determining module includes:

a fourth determining submodule, configured to determine that the transmission of the first control signal meets the transmission limiting condition of the short control signal in a case that the to-be-transmitted position of the first control signal is not in the silent period of other short control signals.

Optionally, in the above embodiments of the present disclosure, the transmission node further includes:

a fifth determining module, configured to determine that the transmission of the first control signal does not meet the transmission limiting condition of the short control signal according to the to-be-transmitted position of the first control signal and a silent period of other short control signals before transmitting the first control signal, where the silent period of other short control signals is: a target time length starting from the transmission ending time of the other short control signals.

Optionally, in the above embodiments of the present disclosure, the fifth determining module includes:

a fifth determining submodule, configured to determine that the transmission of the first control signal does not meet the transmission limiting condition of the short control signal in a case that the to-be-transmitted position of the first control signal is in the silent period of other short control signals.

Optionally, in the above embodiments of the present disclosure, the transmission node further includes:

a sixth determining module, configured to determine the target time length T according to a time length T0 of the short control signal and a maximum duty ratio $\alpha$ of the transmission limiting condition of the short control signal, wherein $$T = \frac{T0}{\alpha} - T0.$$

The transmission node provided by the embodiment of the present disclosure can implement processes implemented by the transmission node in the method embodiments of FIG. 1 to FIG. 4. To avoid repetition, details are not described herein again.

To sum up, according to the embodiments of the present disclosure, by determining whether the transmission of the first control signal meets the transmission limiting condition of the short control signal before transmitting the first control signal, LBT is performed and the first control signal is transmitted with reference to the transmission mechanism of the short control signal in a case that the transmission limiting condition of the short control signal is met, and the transmission performance of the control signal is improved by completely utilizing the transmission mechanism of the control signal in the unlicensed band.

It should be noted that the transmission node provided by the embodiment of the present disclosure is a transmission node capable of performing the above method for transmitting the control signal, and all the embodiments of the above method for transmitting the control signal are suitable for the transmission node and can achieve the same or similar beneficial effect.

Figure 6:
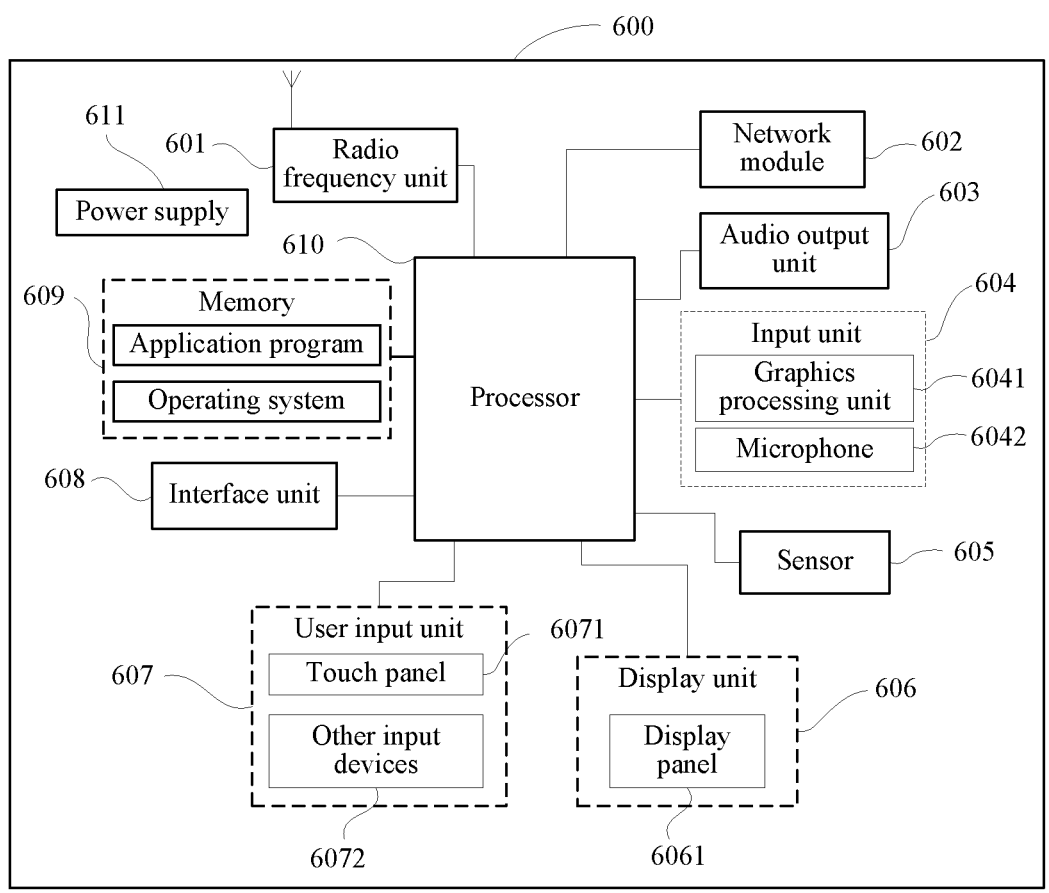
FIG. 6 is a second structural schematic diagram of a transmission node according to an embodiment of the present disclosure.

FIG. 6 is a schematic diagram of a hardware structure of a transmission node implementing embodiments of the present disclosure. The transmission node 600 includes but is not limited to: a radio frequency unit 601, a network module 602, an audio output unit 603, an input unit 604, a sensor 605, a display unit 606, a user input unit 607, an interface unit 608, a memory 609, a processor 610, a power supply 611, and other components. A person skilled in the art may understand that a structure of the transmission node shown in FIG. 6 does not constitute a limitation to the transmission node, and the transmission node may include more or fewer components than those shown in the figure, or some components may be combined, or there may be a different component arrangement. In the embodiments of the present disclosure, the transmission node includes but is not limited to a mobile phone, a base station, a tablet personal computer, a notebook computer, a palmtop computer, a vehicle-mounted terminal, a wearable device, and a pedometer.

The processor 610 is configured to, in a case that transmission of the first control signal meets a transmission limiting condition of a short control signal, transmit the first control signal by LBT of category 1, or transmit the first control signal after performing channel listening by LBT of category 2.

To sum up, according to the embodiments of the present disclosure, by determining whether the transmission of the first control signal meets the transmission limiting condition of the short control signal before transmitting the first control signal, LBT is performed and the first control signal is transmitted with reference to the transmission mechanism of the short control signal in a case that the transmission limiting condition of the short control signal is met, and the transmission performance of the control signal is improved by completely utilizing the transmission mechanism of the control signal in the unlicensed band.

It should be noted that the transmission node provided by the embodiment of the present disclosure is a transmission node capable of performing the above method for transmitting the control signal, and all the embodiments of the above method for transmitting the control signal are suitable for the transmission node and can achieve the same or similar beneficial effect.

It should be understood that, in this embodiment of the present disclosure, the radio frequency unit 601 may be configured to receive and send information or a signal in a call process. Specifically, after receiving downlink data from a base station, the radio frequency unit 601 sends the downlink data to the processor 610 for processing. In addition, the radio frequency unit 601 transmits uplink data to the base station. Usually, the radio frequency unit 601 includes but is not limited to an antenna, at least one amplifier, a transceiver, a coupler, a low noise amplifier, a duplexer, and the like. In addition, the radio frequency unit 601 may also communicate with other devices through a wireless communication system and network.

The transmission node provides a user with wireless broadband Internet access through the network module 602, for example, helps the user send and receive emails, browse web pages, and access streaming media.

The audio output unit 603 may convert audio data received by the radio frequency unit 601 or the network module 602 or stored in the memory 609 into an audio signal, and output the audio signal into sound. In addition, the audio output unit 603 may also provide audio output related to a specific function performed by the transmission node 600 (for example, call signal receiving sound or message receiving sound). The audio output unit 603 includes a loudspeaker, a buzzer, a receiver, and the like.

The input unit 604 is configured to receive audio or video signals. The input unit 604 may include a graphics processing unit (GPU) 6041 and a microphone 6042. The graphics processing unit 6041 is configured to process image data of a static picture or a video obtained by an image capture device (for example, a camera) in a video capture mode or an image capture mode. A processed image frame may be displayed on the display unit 606. The image frame processed by the graphics processing unit 6041 may be stored in the memory 609 (or another storage medium) or sent by using the radio frequency unit 601 or the network module 602. The microphone 6042 may receive a sound and can process such sound into audio data. The processed audio data may be converted, in a telephone call mode, into a format that may be sent by the radio frequency unit 601 to a mobile communication base station for output.

The transmission node 600 further includes at least one sensor 605, for example, a light sensor, a motion sensor, and other sensors. Specifically, the light sensor includes an ambient light sensor and a proximity sensor, where the ambient light sensor may adjust brightness of a display panel 6061 based on brightness of ambient light, and the proximity sensor may turn off the display panel 6061 and/or backlight when the transmission node 600 is moved towards the ear. As a type of the motion sensor, an accelerometer sensor may detect an acceleration value in each direction (generally, three axes), and detect a value and a direction of gravity when the accelerometer sensor is static, and may be configured to recognize a transmission node posture (such as screen switching between landscape and portrait modes, a related game, or magnetometer posture calibration), a function related to vibration recognition (such as a pedometer or a knock), and the like. The sensor 605 may further include a fingerprint sensor, a pressure sensor, an iris sensor, a molecular sensor, a gyroscope, a barometer, a hygrometer, a thermometer, an infrared sensor, and the like. Details are not described herein.

The display unit 606 may be configured to display information entered by a user or information provided for the user. The display unit 606 may include a display panel 6061, and may configure the display panel 6061 in the forms of a liquid crystal display (LCD), an organic light-emitting diode (OLED) and the like.

The user input unit 607 may be configured to receive input numeric or character information, and generate key signal inputs related to user settings and function control of the transmission node. Specifically, the user input unit 607 includes a touch panel 6071 and other input devices 6072. The touch panel 6071, also called a touch screen, may collect a touch operation of the user on or near the touch panel 6071 (for example, the user uses any suitable object or accessory such as a finger or a stylus to operate on or near the touch panel 6071). The touch panel 6071 may include two parts: a touch detection device and a touch controller. The touch detection device detects a touch position of a user, detects a signal brought by a touch operation, and transmits the signal to the touch controller. The touch controller receives touch information from the touch detection apparatus, converts the touch information into contact coordinates, sends the contact coordinates to the processor 610, and receives and executes a command from the processor 610. In addition, the touch panel 6071 may be implemented by various types such as a resistive type, a capacitive type, an infrared ray type or a surface acoustic wave type. In addition to the touch panel 6071, the user input unit 607 may further include the other input devices 6072. Specifically, the other input devices 6072 may include, but are not limited to, a physical keyboard, a function key (for example, a volume control key or a switch key), a trackball, a mouse, and a joystick. Details are not described herein.

Further, the touch panel 6071 may cover the display panel 6061. When detecting a touch operation on or near the touch panel 6071, the touch panel 6071 transmits the touch operation to the processor 610 to determine a type of a touch event. Then, the processor 610 provides corresponding visual output on the display panel 6061 based on the type of the touch event. In FIG. 6, although the touch panel 6071 and the display panel 6061 are used as two independent parts to implement input and output functions of the transmission node, in some embodiments, the touch panel 6071 and the display panel 6061 may be integrated to implement the input and output functions of the transmission node. This is not specifically limited herein.

The interface unit 608 is an interface for connecting an external device to the transmission node 600. For example, the external device may include a wired or wireless headphone port, an external power supply (or a battery charger) port, a wired or wireless data port, a storage card port, a port configured to connect a device having an identity module, an audio input/output (I/O) port, a video I/O port, a headset port, and the like. The interface unit 608 may be configured to receive input (for example, data information and power) from the external device and transmit the received input to one or more elements in the transmission node 600, or may be configured to transmit data between the transmission node 600 and the external device.

The memory 609 may be configured to store software programs and various data. The memory 609 may mainly include a program storage area and a data storage area. The program storage area may store an operating system, an application required by at least one function (for example, a sound playback function and an image playback function), and the like. The data storage area may store data (for example, audio data and an address book) created based on the use of the mobile phone, and the like. In addition, the memory 609 may include a high-speed random access memory, and may also include a nonvolatile memory, for example, at least one disk storage device, a flash memory, or other volatile solid-state storage devices.

The processor 610 is a control center of the transmission node, connects various parts of the entire transmission node by using various interfaces and lines, and performs various functions of the transmission node and processes data by running or executing software programs and/or modules stored in the memory 609 and invoking data stored in the memory 609, to monitor the transmission node as a whole. The processor 610 may include one or more processing units. Optionally, the processor 610 may be integrated with an application processor and a modem processor. The application processor mainly processes an operating system, a user interface, an application program, and the like, and the modem processor mainly processes wireless communication. It may be understood that the foregoing modem processor may not be integrated into the processor 610.

The transmission node 600 may further include the power supply 611 (for example, a battery) configured to supply power to various components. Optionally, the power supply 611 may be logically connected to the processor 610 through a power management system, so as to implement functions such as managing charging, discharging, and power consumption through the power management system.

In addition, the transmission node 600 may further include some functional modules not shown, which will not be elaborated herein.

Optionally, the embodiments of the present disclosure further provide a transmission node, including a processor, a memory, and a computer program stored in the memory and capable of running on the processor. When the computer program is executed by the processor, the processes in the embodiment of the method for transmitting the control signal are implemented, and the same technical effect can be achieved. To avoid repetition, details are not described herein again.

The embodiments of the present disclosure further provide a computer readable storage medium. The computer readable storage medium stores a computer program, and when the computer program is executed by the processor, the processes of the foregoing method embodiment for transmitting the control signal are implemented and the same technical effect can be achieved. To avoid repetition, details are not described herein again. The computer readable storage medium is, for example, a read-only memory (ROM), a random access memory (RAM), a magnetic disk, or an optical disk.

It should be noted that, in this specification, the terms "include", "comprise", or their any other variant is intended to cover a non-exclusive inclusion, so that a process, a method, an article, or a device that includes a list of elements not only includes those elements but also includes other elements which are not expressly listed, or further includes elements inherent to such process, method, article, or device. In the absence of more restrictions, an element defined by the statement "including a . . . " does not exclude another same element in a process, method, article, or device that includes the element.

By means of the foregoing description of the embodiments, a person skilled in the art may clearly understand that the method in the foregoing embodiments may be implemented by software with a necessary general hardware platform. For instance, the technical solutions of the present disclosure essentially or the part that contributes to the prior art may be embodied in the form of software products. The computer software product is stored in a storage medium (such as ROM/RAM, a magnetic disk and an optical disk), including several instructions for enabling one transmission node (which may be a mobile phone, a computer, a server, an air conditioner, or a network device) to implement the method in each embodiment of the present disclosure. The method in the foregoing embodiments may also be implemented by hardware.

The embodiments of the present disclosure are described above with reference to the accompanying drawings, but the present disclosure is not limited to the foregoing specific implementations. The foregoing specific implementations are merely schematic instead of restrictive. Under enlightenment of the present disclosure, a person of ordinary skill in the art may make many forms without departing from the aims of the present disclosure and the protection scope of claims, all of which fall within the protection of the present disclosure.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

The invention claimed is:

1. A method for transmitting a control signal, executed by a transmission node, the method comprising:
   in a case that transmission of a first control signal meets a transmission limiting condition of a short control signal, transmitting the first control signal by listen before talk (LBT) of category 1, or transmitting the first control signal after performing channel listening by LBT of category 2,
   wherein the method further comprises:
   according to a to-be-transmitted position of the first control signal and a preset time length of a target observation window, determining the target observation window as: the preset time length ahead of an end position of the to-be-transmitted position of the first control signal;
   determining that the transmission of the first control signal meets the transmission limiting condition of the short control signal according to transmission information of a target signal in the target observation window before transmitting the first control signal, wherein the target signal comprises: a signal transmitted according to the short control signal in the target observation window, and the first control signal,
   wherein determining that the transmission of the first control signal meets the transmission limiting condition of the short control signal according to the transmission information of the target signal in the target observation window comprises:
   determining that the transmission of the first control signal meets the transmission limiting condition of the short control signal in a case that the transmission information of the target signal in the target observation window meets the transmission limiting condition of the short control signal.

2. The method according to claim 1, further comprising:
   in a case that the transmission of the first control signal does not meet the transmission limiting condition of the short control signal, transmitting the first control signal after performing channel listening by LBT of category 4.

3. The method according to claim 2, further comprising:
   determining that the transmission of the first control signal does not meet the transmission limiting condition of the short control signal according to transmission information of the target signal in the target observation window before transmitting the first control signal.

4. The method according to claim 3, wherein determining that the transmission of the first control signal does not meet the transmission limiting condition of the short control signal according to the transmission information of the target signal in the target observation window comprises:
   determining that the transmission of the first control signal does not meet the transmission limiting condition of the short control signal in a case that the transmission information of the target signal in the target observation window does not meet the transmission limiting condition of the short control signal.

5. The method according to claim 2, further comprising:
   determining that the transmission of the first control signal does not meet the transmission limiting condition of the short control signal according to the to-be-transmitted position of the first control signal and a silent period of other short control signals before transmitting the first control signal,
   wherein the silent period of other short control signals is: a target time length starting from a transmission ending time of the other short control signals.

6. The method according to claim 5, wherein determining that the transmission of the first control signal does not meet the transmission limiting condition of the short control signal according to the to-be-transmitted position of the first control signal and the silent period of other short control signals comprises:
   determining that the transmission of the first control signal does not meet the transmission limiting condition of the short control signal in a case that the to-be-transmitted position of the first control signal is in the silent period of other short control signals.

7. The method according to claim 1, wherein the transmission limiting condition of the short control signal comprises at least one of the followings:
   in the target observation window, a ratio of a total transmission time of the target signal to a total time of the target observation window is less than or equal to a first preset value; or
   in the target observation window, a total transmission number of the target signal is less than or equal to a second preset value, and the total transmission time of the target signal is less than or equal to a third preset value.

8. The method according to claim 1, further comprising:
   determining that the transmission of the first control signal meets the transmission limiting condition of the short control signal according to the to-be-transmitted position of the first control signal and a silent period of other short control signals before transmitting the first control signal,
   wherein the silent period of other short control signals is: a target time length starting from a transmission ending time of the other short control signals.

9. The method according to claim 8, wherein determining that the transmission of the first control signal meets the transmission limiting condition of the short control signal according to the to-be-transmitted position of the first control signal and the silent period of other short control signals comprises:
   determining that the transmission of the first control signal meets the transmission limiting condition of the short control signal in a case that the to-be-transmitted position of the first control signal is not in the silent period of other short control signals.

10. The method according to claim 1, further comprising:
   determining a target time length T according to a time length T0 of the short control signal and a maximum duty ratio α of the transmission limiting condition of the short control signal,
   wherein $$T = \frac{T0}{\alpha} - T0.$$

11. The method according to claim 1, wherein the first control signal is a downlink control signal or an uplink control signal.

12. A transmission node, comprising a processor, a memory and a program stored in the memory and configured to run on the processor, wherein the program, when executed by a processor, causes the processor to implement a method for transmitting a control signal, the method comprising:
   in a case that transmission of a first control signal meets a transmission limiting condition of a short control signal, transmitting the first control signal by listen before talk (LBT) of category 1, or transmitting the first control signal after performing channel listening by LBT of category 2,
   wherein the method further comprises:
   according to a to-be-transmitted position of the first control signal and a preset time length of a target observation window, determining the target observation window as: the preset time length ahead of an end position of the to-be-transmitted position of the first control signal;
   determining that the transmission of the first control signal meets the transmission limiting condition of the short control signal according to transmission information of a target signal in the target observation window before transmitting the first control signal, wherein the target signal comprises: a signal transmitted according to the short control signal in the target observation window, and the first control signal,
   wherein determining that the transmission of the first control signal meets the transmission limiting condition of the short control signal according to the transmission information of the target signal in the target observation window comprises:
   determining that the transmission of the first control signal meets the transmission limiting condition of the short control signal in a case that the transmission information of the target signal in the target observation window meets the transmission limiting condition of the short control signal.

13. The transmission node according to claim 12, wherein the method further comprises:
   in a case that the transmission of the first control signal does not meet the transmission limiting condition of the short control signal, transmitting the first control signal after performing channel listening by LBT of category 4.

14. The transmission node according to claim 13, wherein the method further comprises:
   determining that the transmission of the first control signal does not meet the transmission limiting condition of the short control signal according to transmission information of the target signal in the target observation window before transmitting the first control signal.

15. The transmission node according to claim 13, wherein the method further comprises:
   determining that the transmission of the first control signal does not meet the transmission limiting condition of the short control signal according to the to-be-transmitted position of the first control signal and a silent period of other short control signals before transmitting the first control signal,
   wherein the silent period of other short control signals is: a target time length starting from a transmission ending time of the other short control signals.

16. The transmission node according to claim 12, wherein the method further comprises:
   determining that the transmission of the first control signal meets the transmission limiting condition of the short control signal according to the to-be-transmitted position of the first control signal and a silent period of other short control signals before transmitting the first control signal,
   wherein the silent period of other short control signals is: a target time length starting from a transmission ending time of the other short control signals.

17. A non-transitory computer readable storage medium, storing a program that, when executed by a processor, causes the processor to implement a method for transmitting a control signal, wherein the method is performed by a transmission node and comprises:
   in a case that transmission of a first control signal meets a transmission limiting condition of a short control signal, transmitting the first control signal by listen before talk (LBT) of category 1, or transmitting the first control signal after performing channel listening by LBT of category 2,
   wherein the method further comprises:
   according to a to-be-transmitted position of the first control signal and a preset time length of a target observation window, determining the target observation window as: the preset time length ahead of an end position of the to-be-transmitted position of the first control signal;
   determining that the transmission of the first control signal meets the transmission limiting condition of the short control signal according to transmission information of a target signal in the target observation window before transmitting the first control signal, wherein the target signal comprises: a signal transmitted according to the short control signal in the target observation window, and the first control signal,
   wherein determining that the transmission of the first control signal meets the transmission limiting condition of the short control signal according to the transmission information of the target signal in the target observation window comprises:
   determining that the transmission of the first control signal meets the transmission limiting condition of the short control signal in a case that the transmission information of the target signal in the target observation window meets the transmission limiting condition of the short control signal.

18. The non-transitory computer readable storage medium according to claim 17, wherein the method further comprises:
- in a case that the transmission of the first control signal does not meet the transmission limiting condition of the short control signal, transmitting the first control signal after performing channel listening by LBT of category 4.

19. The non-transitory computer readable storage medium according to claim 18, wherein the method further comprises:
- determining that the transmission of the first control signal does not meet the transmission limiting condition of the short control signal according to transmission information of the target signal in the target observation window before transmitting the first control signal.

20. The non-transitory computer readable storage medium according to claim 19, wherein determining that the transmission of the first control signal does not meet the transmission limiting condition of the short control signal according to the transmission information of the target signal in the target observation window comprises:
- determining that the transmission of the first control signal does not meet the transmission limiting condition of the short control signal in a case that the transmission information of the target signal in the target observation window does not meet the transmission limiting condition of the short control signal.

* * * * *